(12) United States Patent
Enomura et al.

(10) Patent No.: US 11,180,658 B2
(45) Date of Patent: Nov. 23, 2021

(54) PIGMENT COMPOSITION FOR GREEN FILTER AND PRODUCTION METHOD THEREOF

(71) Applicant: M. TECHNIQUE CO., LTD., Izumi (JP)

(72) Inventors: Masakazu Enomura, Izumi (JP); Kaeko Araki, Izumi (JP); Masahito Niikawa, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 0 days.

(21) Appl. No.: 16/347,500

(22) PCT Filed: Oct. 31, 2017

(86) PCT No.: PCT/JP2017/039381
§ 371 (c)(1),
(2) Date: May 3, 2019

(87) PCT Pub. No.: WO2018/084153
PCT Pub. Date: May 11, 2018

(65) Prior Publication Data
US 2019/0256711 A1  Aug. 22, 2019

(30) Foreign Application Priority Data

Nov. 4, 2016  (JP) .............................. JP2016-216754

(51) Int. Cl.
*C09B 47/10* (2006.01)
*G02B 5/20* (2006.01)
*C09B 67/20* (2006.01)

(52) U.S. Cl.
CPC ................ *C09B 47/10* (2013.01); *G02B 5/20* (2013.01)

(58) Field of Classification Search
CPC ............ C09B 67/20; C09B 47/10; G02B 5/20
(Continued)

(56) References Cited

U.S. PATENT DOCUMENTS

2010/0155310 A1  6/2010  Enomura
2013/0220180 A1*  8/2013  Maekawa ............ C09B 67/0026
106/411

(Continued)

FOREIGN PATENT DOCUMENTS

CN       102236257 A      11/2011
EP       2960711    *    12/2015
(Continued)

OTHER PUBLICATIONS

International Search Report, issued in PCT/JP2017/039381, dated Jan. 30, 2018.
(Continued)

*Primary Examiner* — Ling Siu Choi
*Assistant Examiner* — Ronald Grinsted
(74) *Attorney, Agent, or Firm* — Birch, Stewart, Kolasch & Birch, LLP (57) ABSTRACT

A pigment composition for a green filter includes a green pigment consisting of a halogenated zinc phthalocyanine, wherein as spectral transmission characteristics of a dispersion containing only the green pigment as a pigment, the transmittance at 400 nm is 1% or less; the transmittance at 450 nm is 25% or less; the transmittance at 600 nm is 30% or less; the transmittance at 650 nm is 0.3% or less; the transmittance at the peak wavelength is 80% or more; the half value width of the peak wavelength is 120 nm or less; the transmittance at 750 nm is 1% or less; and the transmittance at 800 nm is 20% or less. The pigment composition for a green filter has low transmittance in the blue range, low (Continued)

transmittance in the near infrared range, and high transmittance in the green range by only a green pigment.

6 Claims, 3 Drawing Sheets

(58) Field of Classification Search
USPC ........................................................ 252/582
See application file for complete search history.

(56) References Cited

U.S. PATENT DOCUMENTS

| | | | |
|---|---|---|---|
| 2015/0315471 | A1 | 11/2015 | Ogawa et al. |
| 2015/0321154 | A1 | 11/2015 | Enomura |

FOREIGN PATENT DOCUMENTS

| | | | |
|---|---|---|---|
| JP | 4-114725 | A | 4/1992 |
| JP | 9-269410 | A | 10/1997 |
| JP | 2002-194244 | A | 7/2002 |
| JP | 2003-161827 | A | 6/2003 |
| JP | 2005-141239 | A | 6/2005 |
| JP | 2006-313974 | A | 11/2006 |
| JP | 2008-285532 | A | 11/2008 |
| JP | 2009-112892 | A | 5/2009 |
| JP | 2011-75759 | A | 4/2011 |
| JP | 2012-126893 | A | 7/2012 |
| JP | 5147091 | B1 | 2/2013 |
| JP | 2013-48245 | A | 3/2013 |
| JP | 2013-92684 | A | 5/2013 |
| JP | 2013092684 | * | 5/2013 |
| JP | 2013-156454 | A | 8/2013 |
| JP | 2014-191000 | A | 10/2014 |
| JP | 2016-18156 | A | 2/2016 |
| JP | 2016-20496 | A | 2/2016 |
| WO | WO 2009/008393 | A1 | 1/2009 |
| WO | WO 2012/070263 | A1 | 5/2012 |
| WO | WO 2015/045440 | A1 | 4/2015 |

OTHER PUBLICATIONS

Extended European Search Report, dated Jun. 16, 2020, for European Application No. 17866917.2.
Japanese Office Action for Japanese Application No. 2018-549020, dated Apr. 27, 2021, with English translation.

* cited by examiner

PIGMENT COMPOSITION FOR GREEN FILTER AND PRODUCTION METHOD THEREOF

TECHNICAL FIELD

The present invention relates to a pigment composition for a green filter and a production method thereof.

BACKGROUND ART

In recent years, enlargement of a color reproduction range in a digital color element has been required, and also a color filter having a high transmittance and high color purity has been required. Color filters are roughly classified into a dye type one and a pigment type one. The pigment type color filter having excellent heat resistance and light resistance has been mainly used due to a progress in its production technology.

Among others, regarding a green pigment, a pigment composition comprising a halogenated zinc phthalocyanine pigment, has attracted attention as a material which can provide a color filter having a high transmittance and a wide color reproduction range, and has high mass productivity (See, for example, Patent Literatures 1 and 2).

A pigment composition comprising a halogenated zinc phthalocyanine pigment is suitable as a material used for a green pixel for a digital color element. However, the materials disclosed in Patent Literatures 3 to 5, have a high transmittance in the blue range, and low color purity, and also a low transmittance in the green range.

In addition, the materials disclosed in Patent Literatures 6 to 10, have a problem of a high transmittance in the near infrared range in spite of a high color purity.

Generally, in a color imaging element or a light sensor which is a digital color element, a filter for color separation is provided on a light incident surface of the color imaging element or the light sensor. However, the color imaging element and the light sensor themselves are also sensitive to the near infrared range.

Many filters for color separation also allow a light in the near infrared range to pass through. An infrared cut filter as disclosed in Patent Literature 11 is used in combination, or a combination of dyes and pigments of plural colors is used, in order to perform color separation in accordance with human color vision characteristics. Furthermore, an image processing is performed to a color image data obtained by the color imaging element or the optical sensor, in accordance with the spectral sensitivity of the imaging element or the optical sensor used and the spectral transmission characteristics of the color separation filter or the infrared cut filter, in order to perform natural color reproduction in accordance with human color vision characteristics (see, for example, Patent Literature 12).

There are various types in color filters in which dyes and pigments of a plurality of colors are combined, and various types in infrared cut filters as well. However, color filters capable of completely cutting the near infrared range, do not have flat spectral transmission characteristics in the visible range, and influence color separation, and natural color reproduction is difficult. On the other hand, color filters having substantially flat spectral transmission characteristics in the visible range, have low influence on color separation, but "leakage of infrared lights" is observed in the near infrared range.

Even when leakage of infrared lights is observed, the reproduced color can be corrected by image processing to some extent. However, it is desirable that leakage of infrared lights by a color separation filter itself is small, in order to realize as natural color reproduction as possible. Humans are particularly sensitive to changes in green color due to color vision characteristics. Therefore, the influence of leakage of near infrared lights is great, and the color tone of the entire color image data may be changed as a result of receiving weak near infrared lights.

The case where the digital color element is a color imaging element or a photosensor, has been described above. The same problem can occur also to other digital color elements.

CITATION LIST

Patent Literature

Patent Literature 1: JP 2011-75759
Patent Literature 2: JP 2016-020496
Patent Literature 3: JP 2013-156454
Patent Literature 4: JP H09-269410
Patent Literature 5: JP 2005-141239
Patent Literature 6: JP 2002-194244
Patent Literature 7 JP 2006-313974
Patent Literature 8: JP 2012-126893
Patent Literature 9: JP 2013-092684
Patent Literature 10: JP 2003-161827
Patent Literature 11: JP 2016-018156
Patent Literature 12: JP 2013-048245

SUMMARY OF THE INVENTION

Technical Problem

The conventional green pigments have high transmittance in the near infrared range. Therefore, there was a problem that color reproduction could not be appropriately performed depending on conditions, even if color correction was performed by image processing in addition to using an infrared cut filter, or a combination of dyes and pigments of other colors.

As described above, color correction by image processing has limitations. Accordingly, there has been a demand for a pigment composition for a green filter which has low transmittance in the blue range, low transmittance in the near infrared range, and high transmittance in the green range by only a green pigment, in order to obtain more appropriate image data.

Solution to the Problem

Namely, the present invention provides the following inventions.

(1) The first embodiment of the present invention is a pigment composition for a green filter, comprising a green pigment consisting of a halogenated zinc phthalocyanine, wherein as spectral transmission characteristics of a dispersion containing only the green pigment as a pigment, the transmittance at 400 nm is 1% or less; the transmittance at 450 nm is 25% or less; the transmittance at 600 nm is 30% or less; the transmittance at 650 nm is 0.3% or less; the transmittance at the peak wavelength is 80% or more; the half value width of the peak wavelength is 120 nm or less; the transmittance at 750 nm is 1% or less; and the transmittance at 800 nm is 20% or less.

(2) The second embodiment of the present invention is the pigment composition for a green filter according to (1), wherein as spectral transmission characteristics of the dispersion containing only the green pigment as a pigment, the transmittance at 450 nm is 15% or less; the transmittance at 600 nm is 10% or less; the half width of the peak wavelength is 110 nm or less; and the transmittance at 800 nm is 15% or less.

(3) The third embodiment of the present invention is the pigment composition for a green filter according to (1) or (2), wherein the halogenated zinc phthalocyanine is brominated chlorinated zinc phthalocyanine.

(4) The fourth embodiment of the present invention is the pigment composition for a green filter according to any one of (1) to (3), wherein an average primary particle diameter of the green pigment is 17 nm or less.

(5) The fifth embodiment of the present invention is the pigment composition for a green filter according to any one of (1) to (4), wherein a coefficient of variation of an average primary particle diameter of the green pigment is 20% or less.

(6) The sixth embodiment of the present invention is a method of producing the pigment composition for a green filter according to any one of (1) to (5), comprising a step of precipitating microparticles of the green pigment by mixing a pigment raw material liquid obtained by dissolving a raw material of the green pigment in a solvent, and a precipitation solution for precipitating the green pigment from the pigment raw material liquid, wherein an acidic substance consisting of chlorosulfonic acid is contained in at least one of the pigment raw material liquid and the precipitation solution.

(7) The seventh embodiment of the present invention is the method of producing the pigment composition for a green filter according to (6), wherein the acidic substance selected from a group consisting of sulfuric acid and chlorosulfonic acid is contained in at least the precipitation solution.

Advantageous Effects of the Invention

The present invention can provide a pigment composition for a green filter which has high transmittance in the green range and low transmittance in the blue range and the near infrared range with high color purity. As a result, color reproduction range in a digital color element can be enlarged by applying this composition to the digital color element.

DESCRIPTION OF THE INVENTION

Hereinafter, the present inventions are explained in more detail, but the technical scope of the present inventions is not limited to the following embodiments and examples at all.

Pigment Composition for Green Filter

The pigment composition for a green filter of the present invention is a composition comprising a predetermined green pigment, such as powders of a green pigment; a dispersion in which a green pigment is dispersed in a solvent which is a dispersion medium; a dispersion in which a green pigment is dispersed in a solid such as a glass or resin, and the like. In the pigment composition for a green filter of the present invention, the green pigment is preferably microparticles having predetermined characteristics.

Microparticles

In the present invention, "microparticles" refer to minute particles having a primary particle diameter of 500 nm or less, preferably 100 nm or less, or more preferably 20 nm or less. Form of the particles or microparticles is not particularly limited, but may be, for example, particles in a form of a substantially columnar shape, a substantially spherical shape, a substantially disk shape, a substantially triangular prism shape, a substantially quadrangular prism shape, a substantially polyhedral shape, an elliptical spherical shape, or the like, or aggregates thereof. In the present invention, an average primary particle diameter of the green pigment is preferably 17 nm or less, more preferably 15 nm or less, further preferably 11 nm or less, still more preferably 10 nm or less. A coefficient of variation (CV) of the average primary particle diameter of the green pigment microparticles is preferably 20% or less.

Generally, optical characteristics of a pigment are affected by a surface state of the pigment. When a pigment is microparticles having a primary particle diameter of 500 nm or less, preferably 100 nm or less, more preferably 20 nm or less, the surface area of the pigment becomes larger in contrast with the mass, and the pigment microparticles may sometimes exhibit unique optical characteristics. The inventors of the present invention have found that when a primary particle diameter of a halogenated zinc phthalocyanine described below is minute, the halogenated zinc phthalocyanine shows excellent optical characteristics which were not presented in the past (in particular, decrease of transmittance in the blue range and the near infrared range). In this respect, the pigment composition for a green filter of the present invention shows an excellent effect. In addition, color tone of the halogenated zinc phthalocyanine also changes depending on an amount of halogenation. In the present invention, the pigment composition for a green filter can be prepared in keeping the ratio of chlorine to bromine in the raw material as it is, or in changing the ratio. The pigment composition can be prepared depending on its needs.

Green Pigment

The green pigment in the present invention is not particularly limited as long as it is composed of a halogenated zinc phthalocyanine. The halogenated zinc phthalocyanine contained in the green pigment may be composed of two kinds of halogenated zinc phthalocyanines. In the pigment composition for a green filter of the present invention, the green pigment may be used alone, or one or more kinds of pigments other than the green pigment (halogenated zinc phthalocyanine) may be mixed and used with the green pigment, for adjusting optical characteristics or the like.

In the present invention, spectral transmission characteristics of a dispersion containing only the green pigment as a pigment are such that the transmittance at 400 nm is 1% or less, the transmittance at 450 nm is 25% or less, the transmittance at 600 nm is 30% or less, the transmittance at 650 nm is 0.3% or less, the transmittance at the peak wavelength is 80% or more, the half value width of the peak wavelength is 120 nm or less, the transmittance at 750 nm is 1% or less, and the transmittance at 800 nm is 20% or less. In addition, spectral transmission characteristics of a dispersion containing only the green pigment as a pigment are preferably such that the transmittance at 450 nm is 15% or less, the transmittance at 600 nm is 10% or less, the half width of the peak wavelength is 110 nm or less, and the transmittance at 800 nm is 15% or less.

In the present invention, microparticles of the green pigment are precipitated by using a poor solvent method, an acid paste method, an alkaline paste method, or the like, by mixing a pigment raw material liquid obtained by dissolving a halogenated zinc phthalocyanine (a raw material of the green pigment) which is a raw material of microparticles of the target green pigment in a solvent, and a precipitation solution for precipitating the green pigment from the pigment raw material liquid.

Halogenated Zinc Phthalocyanine

A halogenated zinc phthalocyanine in the present invention is not particularly limited, but examples thereof include brominated chlorinated zinc phthalocyanine, brominated zinc phthalocyanine and the like. Brominated chlorinated zinc phthalocyanine is preferable. A halogen element contained in the halogenated zinc phthalocyanine is preferably chlorine or bromine. A ratio of chlorination and bromination can also be changed for the purpose of adjusting the optical characteristics of green color.

Pigment Raw Material Liquid/Precipitation Solution

A solvent contained in the pigment raw material liquid is not particularly limited as long as it is a solvent capable of dissolving or molecularly dispersing a raw material of the green pigment. A solvent contained in the precipitation solution is not particularly limited as long as it is a solvent capable of precipitating pigment microparticles from the pigment raw material liquid by mixing with the pigment raw material liquid.

Such solvent includes, for example, water, an organic solvent, or a mixed solvent of a plurality of these solvents. The water includes tap water, ion exchange water, pure water, ultrapure water, RO water (reverse osmosis water) and the like. The organic solvent includes, an alcohol solvent, an amide solvent, a ketone solvent, an ether solvent, an aromatic compound solvent, carbon disulfide, an aliphatic compound solvent, a nitrile solvent, a sulfoxide solvent, a halogen compound solvent, an ester solvent, an ionic liquid, a carboxylic acid compound, a sulfonic acid compound and the like. Each of the solvents may be used alone, or a plurality of them may be mixed and used.

A basic substance or an acidic substance may be mixed or dissolved in at least one of the pigment raw material liquid and the precipitation solution. A basic substance includes a metal hydroxide such as sodium hydroxide and potassium hydroxide, a metal alkoxide such as sodium methoxide and sodium isopropoxide, quaternary ammonium hydroxide such as tetrabutyl ammonium hydroxide and benzyl trimethyl ammonium hydroxide and the like, an amine compound such as triethylamine, 2-diethylaminoethanol and diethylamine, and the like. An acidic substance includes an inorganic acid such as aqua regia, hydrochloric acid, nitric acid, fuming nitric acid, sulfuric acid, fuming sulfuric acid, chlorosulfonic acid (chlorosulfuric acid) and the like, and an organic acid such as formic acid, acetic acid, chloroacetic acid, dichloroacetic acid, oxalic acid, trifluoroacetic acid, trichloroacetic acid and the like. These basic substances or acidic substances may be mixed and used with various solvents as described above or used alone as a precipitation solution. A halogenosulfonic acid includes chlorosulfonic acid, bromosulfonic acid and the like.

In particular, it has been found that it is preferable that chlorosulfonic acid is contained in the acidic substance used in the preparation of the pigment composition for a green filter of the present invention. Although details of this reason are unknown, it is presumed that the reason is that a halogen of the halogenated zinc phthalocyanine tends to be desorbed, but the halogen is stabilized by interaction of chlorine of chlorosulfonic acid with the halogen of the phthalocyanine green by addition of chlorosulfonic acid, so that desorption of the halogen can be prevented. Stabilization of the halogen can strengthen green coloration, and can suppress transmission (leakage) in the blue range and near infrared range.

Dispersing Agent

A dispersing agent such as a block copolymer, a high molecular polymer, a surfactant, or a silicon compound as a coating material on a surface of the pigment microparticles may be contained in the pigment raw material liquid or precipitation solution of the present invention, as long as it does not substantially adversely affect the color characteristics of the microparticles of the green pigment to be precipitated. Examples of these dispersants include a decyl benzene sulfonic acid type dispersant of Neogen RK (DKS Co., Ltd.); Solsperse 20000, Solsperse 24000, Solsperse 26000, Solsperse 27000, Solsperse 28000, Solsperse 41090 (Avecia Co., Ltd.); Disperbyk BYK 160, Disperbyk BYK 161, Disperbyk BYK 162, Disperbyk BYK 163, Disperbyk BYK 166, Disperbyk BYK 170, Disperbyk BYK 180, Disperbyk BYK 181, Disperbyk BYK 182, Disperbyk BYK 183, Disperbyk BYK 184, Disperbyk BYK 190, Disperbyk BYK 191, Disperbyk BYK 192, Disperbyk BYK 2000, Disperbyk BYK 2001, Disperbyk BYK 2163, Disperbyk BYK 2164 (BYK Japan K.K.); Polymer 100, Polymer 120, Polymer 150, Polymer 400, Polymer 401, Polymer 402, Polymer 403, Polymer 450, Polymer 451, Polymer 452, Polymer 453, EFKA-46, EFKA-47, EFKA-48, EFKA-49, EFKA-1501, EFKA-1502, EFKA-4540, EFKA-4550 (EFKA Chemical Co., Ltd.); Kaocera 2000, Perex TG (Kao Corporation), and the like. When the surface of the pigment microparticles is coated with silicon compound, the silicon compound is preferably amorphous from the viewpoint of improvement of transmittance and controllability of optical characteristics, though it is not particularly limited.

Reaction Apparatus

In the present invention, particularly the fluid processing apparatus as described in JP 2009-112892 by the present applicant is preferably used for the precipitation reaction of the pigment microparticles. Specific fluid processing according to the present invention will be described later in the examples.

Preparation Apparatus

Various solutions and solvents are prepared in the fluid processing according to the present invention. In the preparation of various solutions and solvents, it is desirable to use an apparatus that realizes homogeneous mixing by applying a shearing force to the fluid, such as an apparatus rotating stirring elements of various shapes such as a rod-like, plate-like, propeller-like shape in a vessel, and an apparatus equipped with screens rotating relative to stirring elements. A preferable example of the high speed rotary dispersion emulsifying apparatus is a stirring apparatus disclosed in JP 5147091.

Further, the rotary dispersion apparatus may be a batch type one or a continuous type one. In the case of a continuous type one, the apparatus may be one which continuously performs supply and discharge of a fluid to and from a stirring vessel, or one which uses a continuous mixer in spite of using a stirring vessel. Stirring energy can be appropriately controlled by using a known stirring apparatus or stirring means.

The stirring energy is described in detail in JP H4-114725 by the present applicant. A stirring method in the present invention is not particularly limited, but it may be performed by using a stirring apparatus such as various shearing type one, friction type one, high pressure jet type one, ultrasonic type one, and the like, a dissolving apparatus, an emulsifying apparatus, a dispersing apparatus, a homogenizing apparatus, etc. Examples of these apparatuses include a continuous emulsifying apparatus such as ULTRA TURRAX (IKA Werke GmbH & Co. KG), Polytron (Kinematica AG), TK Homomixer (PRIMIX Corporation), Ebara Milder (Ebara Corporation), TK Homomic Line Flow (PRIMIX Corporation), Colloid Mill (Shinko Pantec Co., Ltd.), Slasher (Nippon Coke & Engineering Co., Ltd.), Trigonal wet fine pulverizer (Mitsui Miike Machinery Co., Ltd.), Cavitron (Eurotec Co., Ltd.), Fine flow mill (Pacific Machinery & Engineering Co., Ltd), and the like; and a batch type and continuous type emulsifying dispersion apparatus such as CLEAMIX (M. Technique Co., Ltd.), CLEARMIX DISOLVER (M. Technique Co., Ltd.), FILMIX (PRIMIX Corporation) and the like.

In addition, stirring processing is performed using preferably an apparatus which is equipped with stirring blades rotating at a high speed, and with screens outside the stirring blades, and discharges the fluid as an jet flow from the opening of the screens, in particular, the above CLEAMIX (M. Technique Co., Ltd.) or CLEARMIX DISOLVER (M. Technique Co., Ltd.).

EXAMPLE

Hereinafter, the present invention is explained in more detail with reference to examples, but the present invention is not limited only to these examples. In Examples 1 and 2, the first fluid (hereinafter also referred to as liquid A) refers to the first fluid to be processed which is introduced from the first introduction path P1 of the fluid processing apparatus shown in JP 2009-112892, and the second fluid (hereinafter also referred to as liquid B) refers to the second fluid to be processed which is introduced from the second introduction path P2 of the fluid processing apparatus.

Example 1

Example 1 describes a pigment composition for a green filter, comprising microparticles consisting of brominated chlorinated zinc phthalocyanine, pigment PG 58 (Pigment Green 58) as a halogenated zinc phthalocyanine green pigment.

At first, the first fluid (liquid A) and the second fluid (liquid B) were prepared using CLEAMIX (product name: CLM-2.2 S, M. Technique Co., Ltd.). Specifically, based on the formulation of liquid A shown in Example 1 in Table 1, the respective raw materials were weighed and mixed homogeneously by stirring using CLEARMIX at preparation temperature of 20° C. to 30° C. and at the rotor rotational speed of 15,000 rpm for 15 min to prepare liquid A. Similarly, based on the formulations of liquid B shown in Example 1 in Table 1, the respective raw materials were weighed and mixed homogeneously by stirring using CLEARMIX at preparation temperature of 20° C. to 30° C. and at the rotor rotational speed of 15,000 rpm for 15 min to prepare liquid B.

In addition, as sodium hydroxide (97%) and chlorosulfonic acid shown in Table 1, both reagents (special grade) manufactured by Kanto Kagaku Co., Ltd. were used. As PG 58, FASTOGEN GREENA 110 (trade name) manufactured by DIC Corporation was used, and as sulfuric acid, a reagent (class 1) manufactured by Kishida Chemical Co., Ltd. was used.

Figure 4:
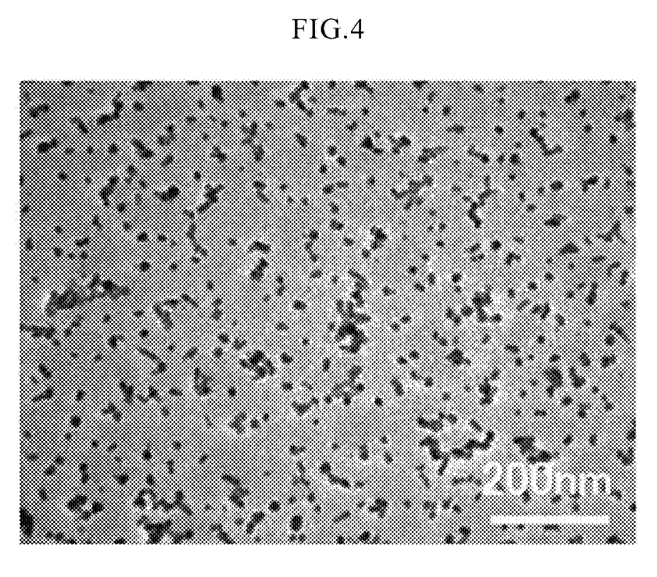
FIG. 4 shows a TEM observation result of PG58 microparticles of Example 3.

Next, the prepared first fluid and second fluid were mixed by the fluid processing apparatus described in FIG. 4 of JP 2009-112892 (the inner diameter of the stirring vessel was 80 mm, and the gap between the peripheral end of the stirring elements and the inner surface of the stirring vessel was 0.5 mm). Specifically, liquid A as the first fluid L1 was introduced from the first introduction path P1 into the stirring vessel, and liquid B as the second fluid L2 was introduced from the second introduction path P2 into the thin film consisting of liquid A pressed against the inner surface of the stirring vessel at the rotational speed of the stirring blade of 7,200 rpm, and was mixed to precipitate microparticles of PG 58. These processing was performed under the liquid sending conditions (introduction flow rate, introduction temperature) of liquid A and liquid B described in Table 1. As a result, the fluid containing PG 58 microparticles precipitated in the thin film fluid was discharged from the discharge pipe of the fluid processing apparatus, and the discharged fluid (hereinafter referred to as PG 58 microparticle dispersion) was collected in a beaker.

Example 2

In the same manner as in Example 1, based on the formulations of liquid A and liquid B shown in Example 2 in Table 1, the respective raw materials were weighed, and liquid A and liquid B were mixed homogeneously by stirring using CLEARMIX to prepare liquid A and liquid B. Thereafter, the prepared liquid A and liquid B were mixed under the liquid sending condition described in Example 2 in Table 1 by the fluid processing apparatus, and the discharged fluid was collected in a beaker.

In Examples 1 and 2, the introduction temperatures of liquid A and liquid B shown in Table 1 were measured using a thermometer provided in the first introduction path p1 and the second introduction path p2. The introduction temperature of liquid A shown in Table 1 is the actual temperature of liquid A in the first introduction path p1. Similarly, the introduction temperature of liquid B shown in Table 1 is the actual temperature of liquid B in the second introduction path p2. For the pH measurement, the pH meter, model number D-51 manufactured by Horiba Ltd. was used, and the pH of the PG 58 microparticle dispersion collected from the discharge pipe of the processing apparatus in the beaker, was measured.

Example 3

In the same manner as in Examples 1 and 2, based on the formulations of liquid A and liquid B shown in Example 3 in Table 1, the respective raw materials were weighed, and liquid A and liquid B were mixed homogeneously by stirring using CLEARMIX to prepare liquid A and liquid B.

Thereafter, the prepared liquid A and liquid B were mixed in the thin film fluid formed by introducing the pigment raw material liquid and the precipitation solution between two processing surfaces being capable of approaching to and separating from each other and rotating relative to each other, by using the fluid processing apparatus described in FIG. 1(A) in WO 2009/008393.

In Example 3, liquid A refers to the first fluid to be processed, which is introduced from the first introduction path d1 of the fluid processing apparatus shown in WO 2009/008393, and similarly, liquid B refers to the second fluid to be processed, which is introduced from the second introduction path d2 of the fluid processing apparatus.

Specifically, liquid A as the first fluid was introduced in the space between the processing surfaces 1 and 2 using the second processing member 20 having the annular opening, and liquid B as the second fluid was introduced in the space between the processing surfaces 1 and 2 at the rotational speed of the first processing member 10 of 1,700 rpm. Liquid A and liquid B were mixed in the thin film fluid to precipitate PG 58 microparticles in the space between the processing surfaces 1 and 2. These processing was performed under the liquid sending conditions (introduction flow rate, introduction temperature) of liquid A and liquid B described in Table 1. As a result, the fluid containing PG 58 microparticles precipitated in the thin film fluid was discharged from the space between the processing surfaces 1 and 2. The discharged fluid (hereinafter referred to as PG 58 microparticle dispersion) was collected in a beaker.

The introduction temperatures of liquid A and liquid B shown in Table 1 were measured using a thermometer provided in a sealed inlet path leading to the space between the processing surfaces 1 and 2 (the first introduction part d1 and the second introduction part d2). The introduction temperature of liquid A shown in Table 1 is the actual temperature of liquid A in the first introduction path p1. Similarly, the introduction temperature of liquid B shown in Table 1 is the actual temperature of liquid B in the second introduction path p2. For the pH measurement, the pH meter, model number D-51 manufactured by Horiba Ltd. was used, and the pH of the PG 58 microparticle dispersion collected in the beaker after discharge, was measured.

Comparative Example

In the same manner as in Examples, based on the formulations of liquid A and liquid B shown in Comparative Example in Table 1, the respective raw materials were weighed, and liquid A and liquid B were mixed homogeneously by stirring using CLEARMIX to prepare liquid A and liquid B. Thereafter, the prepared liquid A and liquid B were mixed under the liquid sending condition described in Comparative Example in Table 1 by the same fluid processing apparatus as in Examples 1 and 2, and the discharged fluid was collected in a beaker.

In Comparative Example, the introduction temperatures of liquid A and liquid B shown in Table 1 were measured using a thermometer provided in the first introduction path p1 and the second introduction path p2. The introduction temperature of liquid A shown in Table 1 is the actual temperature of liquid A in the first introduction path p1. Similarly, the introduction temperature of liquid B shown in Table 1 is the actual temperature of liquid B in the second introduction path p2. For the pH measurement, the pH meter, model number D-51 manufactured by Horiba Ltd. was used, and the pH of the PG 58 microparticle dispersion collected from the discharge pipe of the processing apparatus in the beaker, was measured.

In Examples 1 to 3, dry powders and wet cake samples were produced from the PG 58 microparticle dispersion which was discharged from the fluid processing apparatus, and collected in a vessel. The manufacturing method was conducted according to a conventional method of this type of processing. The discharged PG 58 microparticle dispersion was collected, and precipitated, and the supernatant was removed. Thereafter, the PG 58 microparticles were washed and settled three times repetitively. A part of the finally obtained wet cake of the PG 58 microparticles was dried at room temperature for 12 hours to obtain the dry powders. The rest was the wet cake sample.

TABLE 1

| | Formulation of liquid A | | Formulation of liquid B | | Liquid sending condition of liquid A | | Liquid sending condition of liquid B | | Discharged liquid | |
|---|---|---|---|---|---|---|---|---|---|---|
| | Raw material | wt % | Raw material | wt % | Introduction flow rate (ml/min) | Introduction temperature (° C.) | Introduction flow rate (ml/min) | Introduction temperature (° C.) | pH | Temperature (° C.) |
| Example 1 | NaOH (97%) | 15.6 | PG58 | 2.0 | 210 | 19 | 30 | 25 | <1 | 30 |
| | | | Chlorosulfonic acid | 1.0 | | | | | | |
| | Pure water | 84.4 | Sulfuric acid | 97.0 | | | | | | |
| Example 2 | NaOH (97%) | 15.6 | PG58 | 2.0 | 300 | 6 | 50 | 25 | 12.84 | 33 |
| | | | Chlorosulfonic acid | 1.0 | | | | | | |
| | Pure water | 84.4 | Sulfuric acid | 97.0 | | | | | | |
| Example 3 | NaOH (97%) | 15.6 | PG58 | 2.0 | 195 | 6 | 45 | 25 | 2.97 | 52 |
| | | | Chlorosulfonic acid | 1.0 | | | | | | |
| | Pure water | 84.4 | Sulfuric acid | 97.0 | | | | | | |
| Comparative Example | NaOH (97%) | 15.6 | PG58 | 2.0 | 334 | 6 | 50 | 25 | 12.84 | 30 |
| | Pure water | 84.4 | Sulfuric acid | 98.0 | | | | | | |

Preparation of TEM Observation Sample

A part of the wet cake sample of the PG 58 microparticles after the washing treatment obtained in Examples 1 to 3 and Comparative Example, was dispersed in a 0.05 wt % aqueous solution of Neogen RK. The resulting dispersion was dropped to a collodion membrane, and dried to prepare a TEM (transmission electron microscope) observation sample. A primary particle diameter of the PG 58 microparticles was measured by TEM observation using a transmission electron microscope, JEM-2100 (JEOL Ltd.). The results are shown in Table 2. In addition, chlorine concentration and bromine concentration contained in PG 58 were measured with TEM-EDS. JED-2300 (JEOL Ltd.) was used for TEM-EDS.

The observation condition was the acceleration voltage of 80 kV, and the observation magnification of 25,000 times or more. The particle diameters (D) described in Table 2, are the primary particle diameters, and were calculated from the maximum distance between two points on the outer periphery of the microparticles, and the average value of the measured particle diameters of 100 particles was shown. In addition, the coefficient of variation (CV value) was calculated using the measured values of each particle. With respect to TEM-EDS, 10 fields of view were measured, and Cl for Zn and Br for Zn were calculated from the atomic weight % of Zn, Cl and Br, and the average values were shown. The values of average primary particle diameters and coefficients of variation, ratios of Cl/Zn and Br/Zn in respective examples are as listed in Table 2.

TABLE 2

Figure 2:
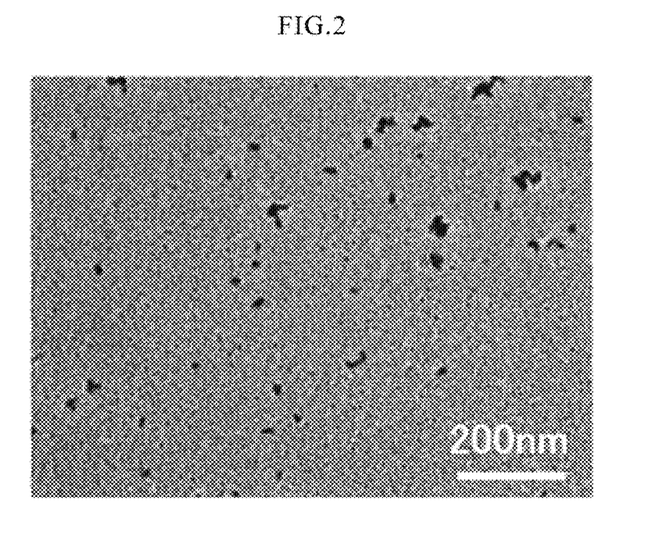
FIG. 2 shows a TEM observation result of PG58 microparticles of Example 1.
Figure 3:
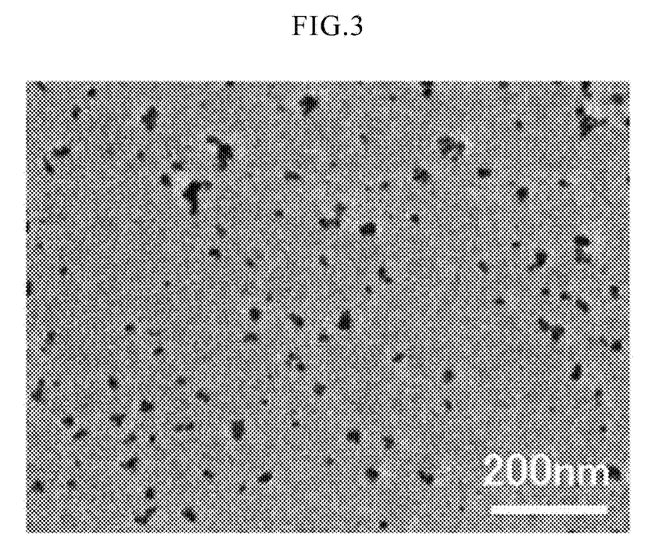
FIG. 3 shows a TEM observation result of PG58 microparticles of Example 2.
Figure 5:
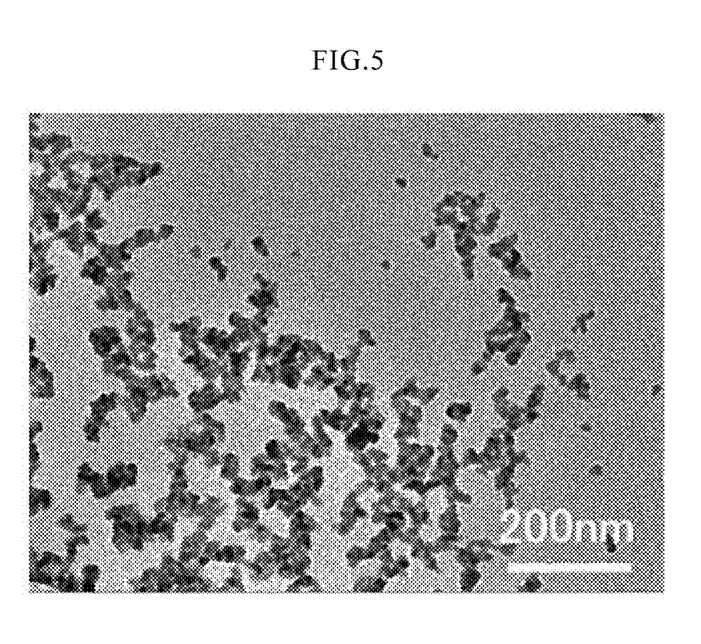
FIG. 5 shows a TEM observation result of PG58 microparticles of Comparative Example.

|  | Particle diameter D (nm) | CV value (%) | Ratio of elements Cl/Zn | Ratio of elements Br/Zn | Electron microscope picture |
|---|---|---|---|---|---|
| Example 1 | 9.6 | 16 | 1.40 | 10.39 | FIG. 2 |
| Example 2 | 10.4 | 16 | 1.36 | 11.33 | FIG. 3 |
| Example 3 | 14.9 | 14 | 1.21 | 10.99 | FIG. 4 |
| Comparative Example | 18.6 | 24 | 0.60 | 8.54 | FIG. 5 |

Measurement of Spectral Transmission Characteristics

In order to measure the spectral transmission characteristics of Examples and Comparative Example, a wet cake of the obtained PG 58 was added to a 0.1 wt % aqueous solution of gum arabic to become a concentration of 1 wt %, and was subjected to the dispersion treatment for 30 minutes using an ultrasonic dispersing apparatus, for a sample for an ultraviolet visible spectrophotometer measurement. Thereafter, the obtained dispersion was diluted with 1 wt % aqueous solution of gum arabic to become a concentration of 0.005 wt % to prepare a measurement sample. An ultraviolet-visible spectrophotometer UV-2450 (Shimadzu Corporation) was used for the measurement.

Figure 1:
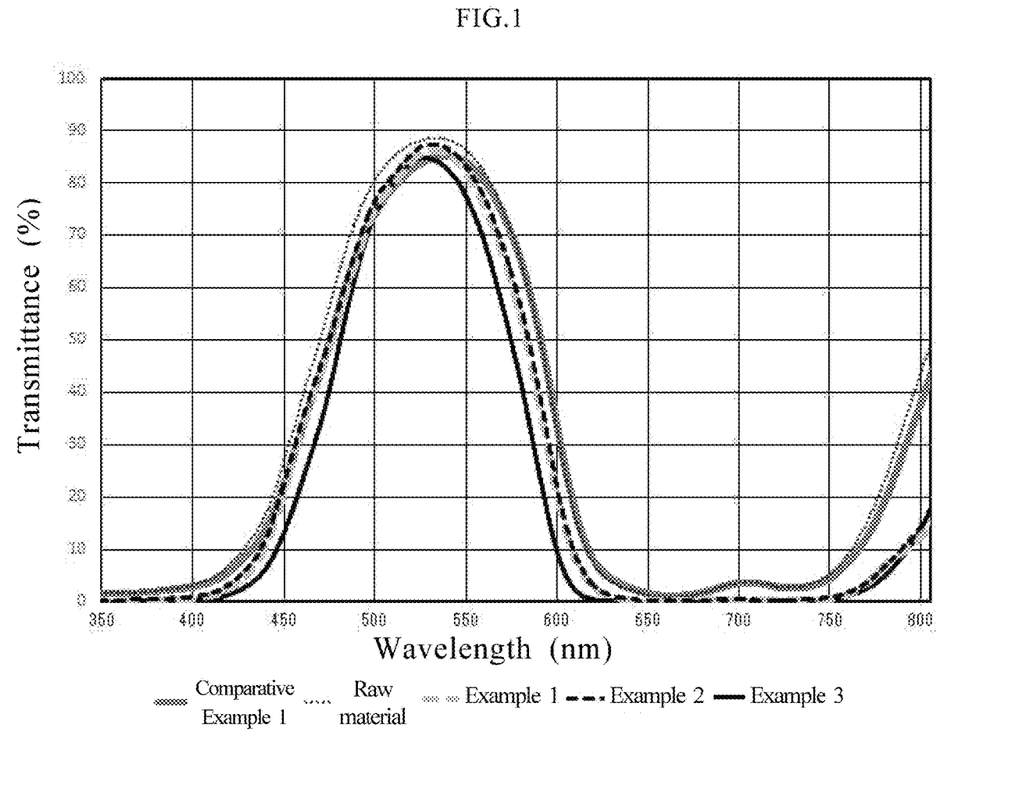
FIG. 1 shows spectral transmission characteristics of Examples of the present invention and Comparative Example.

FIG. 1 shows graphs of the spectral transmission characteristics of Examples according to the present invention and Comparative Example. Table 3 also shows the peak wavelengths (nm), the half value widths (nm) of the peak wavelengths, and the transmittances at each wavelength described in Table 3, in the spectral transmission characteristics of Examples and Comparative Example.

TABLE 3

|  | Peak wavelength (nm) | Half value width of peak wavelength (nm) | Transmittance at each wavelength (%) | | | | | | |
|---|---|---|---|---|---|---|---|---|---|
|  |  |  | 400 nm | 450 nm | Peak wavelength | 600 nm | 650 nm | 750 nm | 800 nm |
| Example 1 | 533 | 117.0 | 0.606 | 20.909 | 86.269 | 20.535 | 0.101 | 0.499 | 12.448 |
| Example 2 | 533 | 119.6 | 0.940 | 22.443 | 87.381 | 20.057 | 0.189 | 0.813 | 14.397 |
| Example 3 | 528 | 103.6 | 0.276 | 13.173 | 84.721 | 9.618 | 0.108 | 0.473 | 13.969 |
| Comparative Example | 539 | 128.0 | 2.843 | 22.299 | 85.059 | 33.704 | 1.540 | 4.431 | 37.833 |
| Bulk powders (Reference) | 534 | 128.8 | 3.183 | 26.680 | 88.536 | 32.635 | 1.321 | 5.254 | 43.709 |

In Table 3, narrowness of the half value widths of the peak wavelength indicates that color purity is high. Low transmittance at 400 nm and 450 nm in the blue range indicates good color separation from blue color. Similarly, low transmittance at 600 nm and 650 nm indicates good color separation from red color. Low transmittance at 750 nm and 800 nm indicates low transmittance in the near infrared range, that is, small leakage of near infrared lights. In addition, height of the transmittance of the peak wavelength indicates high transmittance in the green range.

According to these results, it is understood that a pigment composition for a green filter having high color purity can be provided in Examples 1 to 3, which have low transmittance in the blue range, low transmittance in the near infrared range, compared with the bulk powders of PG 58 (described as bulk powders in Table 3) and PG 58 of Comparative Example. Among them, it is understood that microparticles of a green pigment having particularly high color purity were obtained in Example 3.

The invention claimed is:

1. A pigment composition for a green filter, comprising a green pigment consisting of a halogenated zinc phthalocyanine, wherein as spectral transmission characteristics of a dispersion containing only the green pigment as a pigment,
the transmittance at 400 nm is 1% or less,
the transmittance at 450 nm is 15% or less,
the transmittance at 600 nm is 10% or less,
the transmittance at 650 nm is 0.3% or less,
the transmittance at the peak wavelength is 80% or more,
the half value width of the peak wavelength is 110 nm or less,
the transmittance at 750 nm is 1% or less, and
the transmittance at 800 nm is 15% or less.

2. The pigment composition for a green filter according to claim 1, wherein the halogenated zinc phthalocyanine is brominated chlorinated zinc phthalocyanine.

3. The pigment composition for a green filter according to claim 1, wherein an average primary particle diameter of the green pigment is 17 nm or less.

4. The pigment composition for a green filter according to claim 1, wherein a coefficient of variation of an average primary particle diameter of the green pigment is 20% or less.

5. A method of producing the pigment composition for a green filter according to claim 1, comprising a step of precipitating microparticles of the green pigment by mixing a pigment raw material liquid obtained by dissolving a raw material of the green pigment in a solvent, and a precipitation solution for precipitating the green pigment from the pigment raw material liquid,
   wherein an acidic substance consisting of chlorosulfonic acid is contained in at least one of the pigment raw material liquid and the precipitation solution.

6. The method of producing the pigment composition for a green filter according to claim 5, wherein the acidic substance selected from a group consisting of sulfuric acid and chlorosulfonic acid is contained in at least the precipitation solution.

* * * * *